United States Patent [19]

Henze et al.

[11] 4,044,489
[45] Aug. 30, 1977

[54] TROLLING APPARATUS

[75] Inventors: Walter J. Henze; San Thein, both of Philadelphia, Pa.

[73] Assignee: Penn Fishing Tackle Mfg. Co., Philadelphia, Pa.

[21] Appl. No.: 680,118

[22] Filed: Apr. 26, 1976

[51] Int. Cl.$^2$ ............................................. A01K 97/10
[52] U.S. Cl. .................................................... 43/27.4
[58] Field of Search ................... 43/27.4, 21.2, 43.12, 43/8, 6.5, 4; 242/106

[56] References Cited

U.S. PATENT DOCUMENTS

| | | | |
|---|---|---|---|
| 2,580,130 | 12/1951 | Rowdon | 43/21.2 |
| 2,888,770 | 6/1959 | Patrick | 43/4 |
| 3,937,415 | 2/1976 | Prinz | 43/27.4 |

Primary Examiner—Warner H. Camp
Attorney, Agent, or Firm—Z. T. Wobensmith, 2nd; Z. T. Wobensmith, III

[57] ABSTRACT

A trolling apparatus for fishing which includes a large diameter reel mounted on a frame with a supply of line thereon which line extends to a pulley mounted on a boom connected to the frame and which may extend from the boat for fishing. The frame is mounted by a plate to a swivel base which permits the frame and boom to be swung about to desired positions without any locking or unlocking action, trolling positions being fixed by the relative motion of the boat with respect to the water and which permits the frame and boom to be locked in out-of-the-way positions when the unit is not in use, and with positive stops to prevent the base from rotation in excess of 180°. The swivel base is fastened to the deck or transom of the boat and may be mounted on either side of the boat without modification.

8 Claims, 8 Drawing Figures

TROLLING APPARATUS

BACKGROUND OF THE INVENTION

1. Field of the Invention

This invention relates to a trolling apparatus for fishing of the reel and boom type which is detachably mounted to a swivel base.

2. Description of the Prior Art

When using trolling apparatus it is desirable to be able to readily position the boom during use, to be able to lock it in a convenient position when not in use, and to be able to use the same apparatus on both sides of the boat.

The apparatus previously available was difficult to operate and utilized a locking device such as a pin carried by the frame which could engage holes in the base plate or in a vertical shaft about which the base rotated. The holes must be located so as to permit the apparatus to be mounted at any boat location and the boom to be easily positioned. An example of such apparatus is shown in the U.S. Pat. No. 3,937,415 to Prinz.

While in use, the frame and boom need to be swung about to desired positions quickly, using only one hand if possible. The trolling apparatus previously available are not satisfactory as the pins are clumsy and awkward to use, requiring a lot of time and two hand operation. Moreover, the trolling lines are not separated widely enough so that line entanglements are avoided while the boat is in motion.

In addition, positive stops are not provided to prevent the boom from interfering with other lines or encroaching upon the safety of the boat operation.

SUMMARY OF THE INVENTION

This invention relates to trolling apparatus for fishing which includes a large diameter reel mounted on a frame with a boom mounted to and extending from the frame with line from the reel extending over a pulley mounted on the boom and the frame is mounted to a plate which is secured to a swivel base. While the swivel base can be rotated freely within allowable limits, positive stops are provided to prevent any rotation beyond allowable limits which have been selected to meet the operational needs.

Rotation of the swivel base is also provided with locking positions 90° around the base. Locking of the boom is required only when the apparatus is not in use.

The principal object of the invention is to provide trolling apparatus that can be mounted at many suitable locations on a boat and which provides easy positioning of a boom without requiring any locking or unlocking operation.

A further object of the invention is to provide trolling apparatus that is convenient to use and has stops to prevent accidental unwanted swinging of the apparatus.

A further object of the invention is to provide trolling apparatus which can be locked in a convenient positon when not in use.

A further object of the invention is to provide trolling apparatus that is easily detachable from a boat, and leaves on the boat a base plate which can also serve as a step plate.

Other objects and advantageous features of the invention will be apparent from the description and claims.

DESCRIPTION OF THE DRAWINGS

The nature and characteristic features of the invention will be made readily understood from the following description taken in connection with the accompanying drawings forming part hereof, in which.

Figure 1:
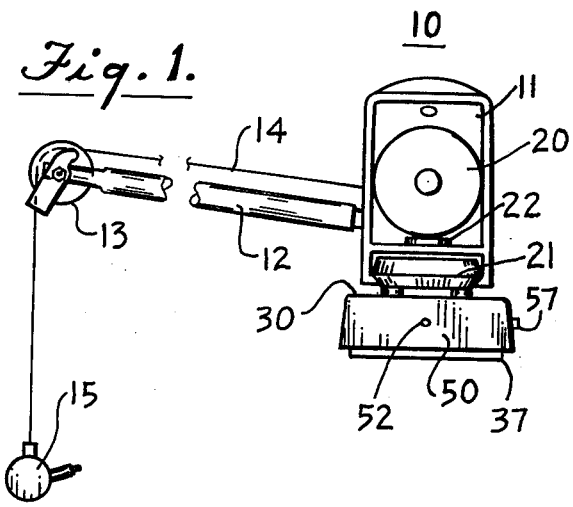
FIG. 1 is a side elevational view illustrating the trolling apparatus of our invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings and FIGS. 1 to 4, inclusive, the trolling apparatus 10 for fishing includes a frame 11 which carries a boom 12 therein which boom 12 has a pulley 13 affixed thereto at its end opposite to the frame 10 and with a line 14 carried by the pulley 13. The line 14 has trolling weights 15 thereon of well known type and is carried by a reel (not shown) mounted on frame 11 in a well known manner. The frame 11 also can carry a depth counter 20 of well known type.

The frame 11 is detachably mounted to a mounting plate 21 of rectangular shape by a hold down knob 22 which is engaged in a threaded opening 23 of plate 21. The frame 11, boom 12, pulley 13 and reel (not shown) are all constructed of light weight materials which are strong and non corrosive and are all described in greater detail in our prior application Ser. No. 556,552 filed Mar. 10, 1975.

The plate 21 of rectangular shape is preferably formed of a synthetic plastic composition of well known type with an upper non skid surface 25 and can serve as a step plate when the frame 11 is not mounted thereon.

The mounting plate 21 is detachably fastened to a swivel plate 30 of molded synthetic plastic which has four inserts 31 molded therein which receive the screws 27, extending through a cover plate 26. The cover plate 26 is preferably formed of anodized aluminum and provides a cover for the opening in swivel plate 30.

The swivel plate 30 has a pin 32 molded therein which extends downwardly through an opening 33 in a disc member 35 therebelow which member 35 rests on the top surface 36 of a bottom plate 37.

The plate 37 is of molded synthetic plastic and has a groove 38 therein which receives the pin 32 from disc member 35.

The plate 37 has a shaft 40 moulded therein in the center thereof and extending vertically upwardly through a central opening 41 in the disc member 35 and an opening 42 in the top plate 30. The shaft 40 has an upper threaded portion 43 with a nut 44 and washers 45 thereon for retention of the top plate 30, disc 35 and bottom plate 37 in assembled relation.

The top swivel plate 30 has a peripheral downwardly extending skirt 50 which extends over the outside surface 51 of the bottom plate 37 and has spaced openings 52 therearound at intervals of 90° with three in number illustrated. The base plate 37 has an insert 55 therein, extending radially, with a spring 56 bearing against a threaded shaft 57 which can be turned outwardly and engaged in one of the openings 52 to lock the plate 30 and the plate 37 together.

The base plate 37 has four screws 58 engaged therein which are engaged with the deck or transom of the boat (not shown) to permit of mounting the plate 37 thereto.

Figure 5:
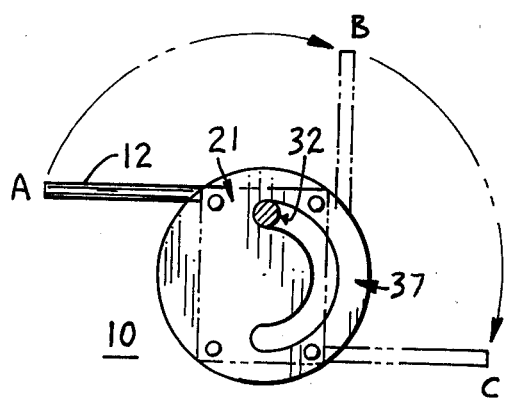
FIG. 5 is a schematic view of the trolling apparatus of our invention.
Figure 6:
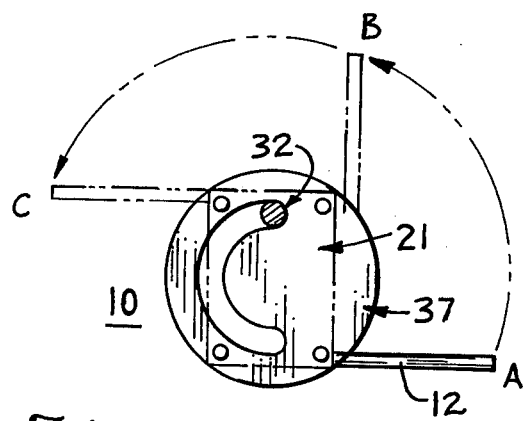
FIG. 6 is a view similar to FIG. 5 but with the trolling apparatus installed to permit a different swiveling action than FIG. 5.
Figure 2:
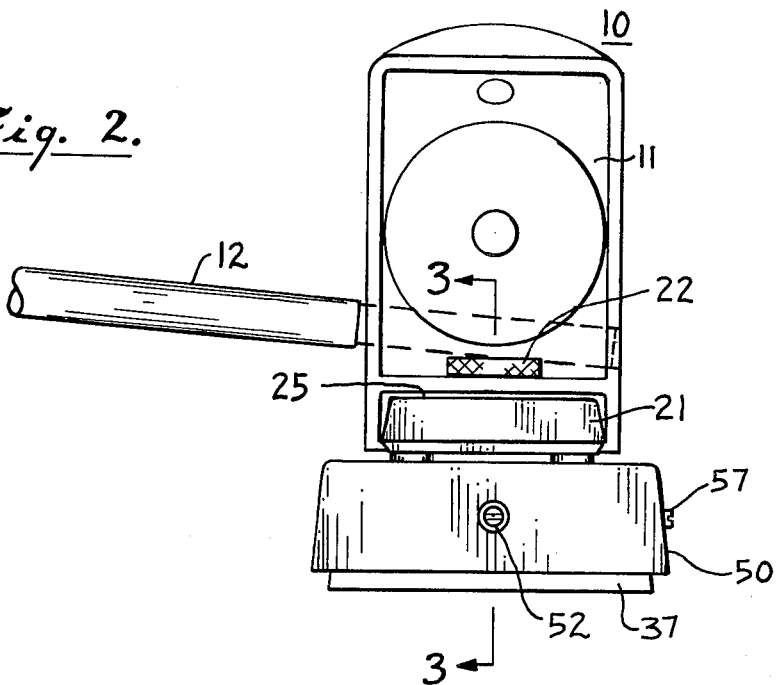
FIG. 2 is a fragmentary side elevational view, enlarged of the apparatus illustrated in FIG. 1.
Figure 3:
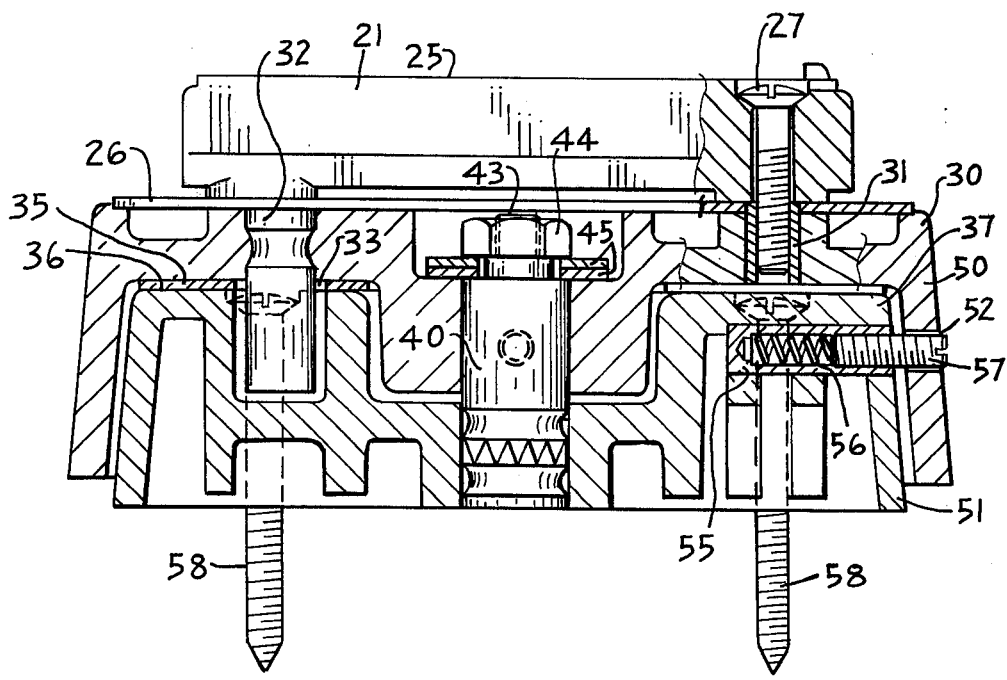
FIG. 3 is a vertical sectional view, enlarged, taken approximately on the line 3—3 of FIG. 2.
Figure 4:
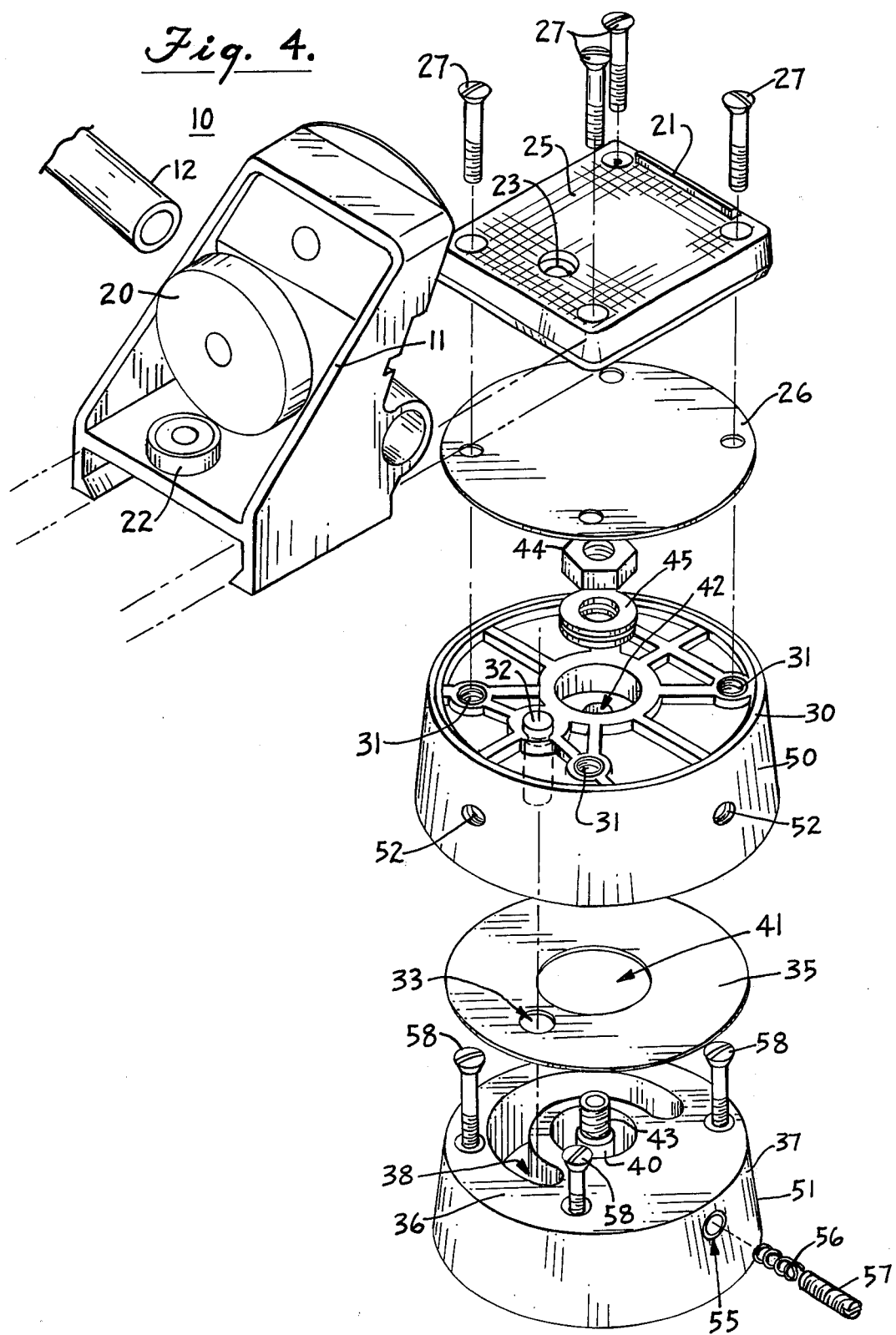
FIG. 4 is an exploded perspective view of the trolling apparatus of our invention.

Referring now to FIGS. 5 and 6, a trolling apparatus 10 is shown mounted in two different modes so that in FIG. 5, boom 12 and pin 32 are closer together than in FIG. 6. The two different modes of mounting can easily be done by orienting mounting plate 21 on swivel plate 30. The trolling frame 11 and boom 12 can be swung about freely between positions A and C and are restricted from further movement by pin 32 striking the ends of groove 38 in plate 37. In both FIGS. 5 and 6, the frame 11 and boom 12 can be locked in any of positions A, B and C by turning threaded shaft 57 outwardly and engaging it in one of the three openings 52 corresponding to the A, B and C positions.

Figure 7:
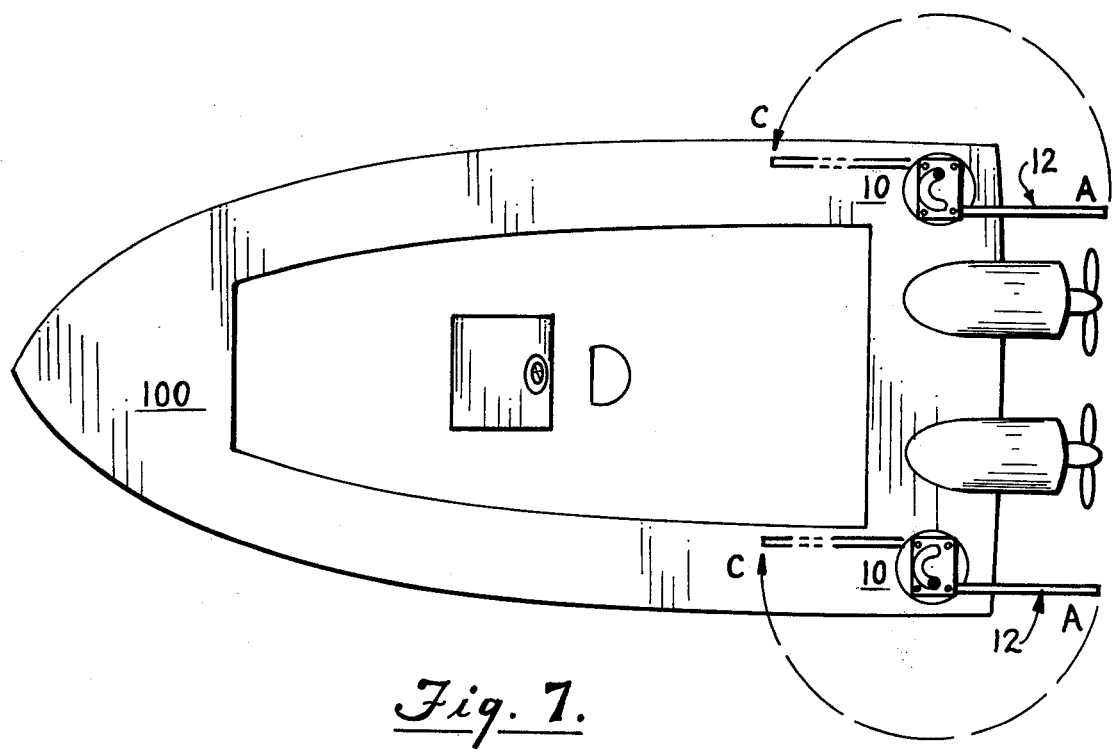
FIG. 7 is a schematic view of a pair of trolling apparatus installed on a boat.
Figure 8:
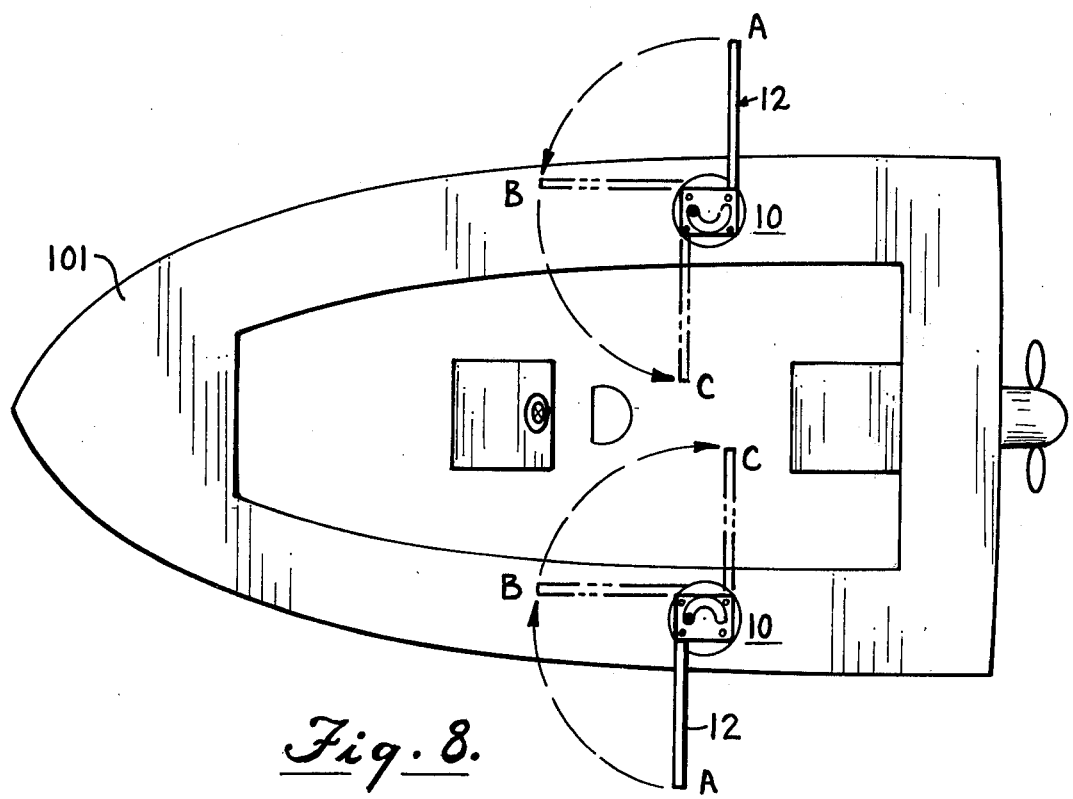
FIG. 8 is a view similar to FIG. 7 but with the trolling apparatus installed at a different location on the boat.

Referring now to FIGS. 7 and 8, pairs of trolling apparatus 10 are shown mounted to opposite sides of a boat 100 and 101 in various modes. In all modes, bottom plate 37 has been mounted in such a way that groove 38 would be facing inboard. The purpose for this particular orientation is that because of the movement forces exerted by the trolling lines it is advantageous that the forces be borne mostly by the outer half of bottom plate 37, which load bearing surface is solid without any groove.

The trolling apparatus on the left side in both FIGS. 7 and 8 is mounted in the same mode as in FIG. 5. The trolling apparatus on the right side on both FIGS. 7 and 8 is mounted in the same mode as in FIG. 6. In all the apparatus shown in FIGS. 7 and 8, the frame and boom can be swung about freely between positions A and C. Before trolling, certain preparations are required with the tip of boom 12 within easy reach from the interior of the boat. This accessibility of the boom 12 is satisfied by having the boom swung to position C. After finishing the necessary preparations, boom 12 can be swung to position A and trolling begins.

In FIG. 7, the booms 12 are prevented from swinging towards each other beyond position A. It should be noted that this arrangement obviates any entanglement of the lines (not shown) which extend from boom 12 as currents at any angle to the boat will carry the trolling lines in the same direction and the distance therebetween will remain greater than or relatively the same as when the boat is trolling directly ahead and the lines are directly astern. When the trolling apparatus is not in use, it can be locked in position C with boom 12 being out of the way.

In FIG. 8, the trolling apparatus 10 are mounted on each side of a boat 101 forward of the stern and can be freely swung inboard to position C for any preparation required or outboard to position A for trolling. While trolling, the action of the trolling lines (not shown) would be to attempt to swing the boom 12 astern from position a. This is prevented because at position A the end of groove 38 is engaged by pin 32. When the trolling apparatus is not in use, it can be locked in position B with boom 12 being in out of the way position.

It should be noted that no locking device is required while the trolling apparatus is in use and that all necessary swinging of the frame and boom is easy and free as a one-hand operation.

It should also be noted that, when the trolling apparatus is not in use, it can be locked in position with boom 12 out of the way.

It should also be noted that the frame 11 together with all the parts attached thereto can be easily removed for storage by turning the hold down knob 22 and sliding the frame 11 off plate 21 leaving plate 21 on the boat and which can serve as a step plate.

It will thus be seen that apparatus has been provided with which the objects of the invention are achieved.

We claim:
1. Trolling apparatus for fishing which comprises
a frame,
a reel mounted on said frame,
a boom secured to said frame with a pulley attached thereto for carrying line from said reel,
a swivel base,
means for detachably connecting said frame to said swivel base,
said swivel base including a fixed bottom plate, and
a rotatable top swivel plate detachably secured together and to which said frame is detachably connected, and
said swivel plate and said bottom plate having interengaging portions limiting free horizontal pivotal movement of said frame through a predetermined arc relative to the bottom plate.
2. Trolling apparatus as defined in claim 1 in which
said top swivel plate carries one of said interengaging portions comprising a downwardly extending pin, and said bottom plate carries the other of said interengaging portions comprising a groove with receives said pin to limit rotation of said top swivel plate.
3. Trolling apparatus as defined in claim 2 in which
a disc member is interposed between said top plate and said bottom plate, and
said disc member has an opening through which said pin extends.
4. Trolling apparatus for fishing as defined in claim 1 in which
said top plate has a downwardly extending skirt with at least one opening therethrough, and
said bottom plate has a movable stop member engageable in said opening to prevent relative motion between said top swivel plate and said bottom plate.
5. Trolling apparatus for fishing which comprises
a frame,
a reel mounted on said frame,
a boom secured to said frame with a pulley attached thereto for carrying line from said reel,
a swivel base,
means for detachably connecting said frame to said swivel base, said swivel base including a fixed bottom plate and, a rotatable top swivel plate detachably secured together, a mounting plate to which said frame is slidably detachably connected, and a securing member engaging said frame and said mounting plate.

6. Trolling apparatus for fishing as defined in claim 5 in which a cover plate is provided carried by said top swivel plate.

7. Trolling apparatus as defined in claim 1 in which said swivel base comprises a disc member interposed between said bottom plate and said top plate, a vertical shaft carried by said bottom plate extending through an opening in said disc member and received in said top plate, and a threaded portion on said shaft and a nut engaged with said threaded portion for detachably retaining the top and bottom plates together.

8. Trolling apparatus as defined in claim 1 in which said swivel base comprises a vertical shaft carried by said bottom plate and received in said top plate, a threaded portion on said shaft and a nut engaged with said threaded portion, said top plate having a shoulder and washer members carried on said vertical shaft for engagement with said shoulder and by said nut, the positioning of said nut determining the frictional engagement of said washer members thereby to restrain rotary movement of said top plate with respect to said bottom plate.

* * * * *